UNITED STATES PATENT OFFICE.

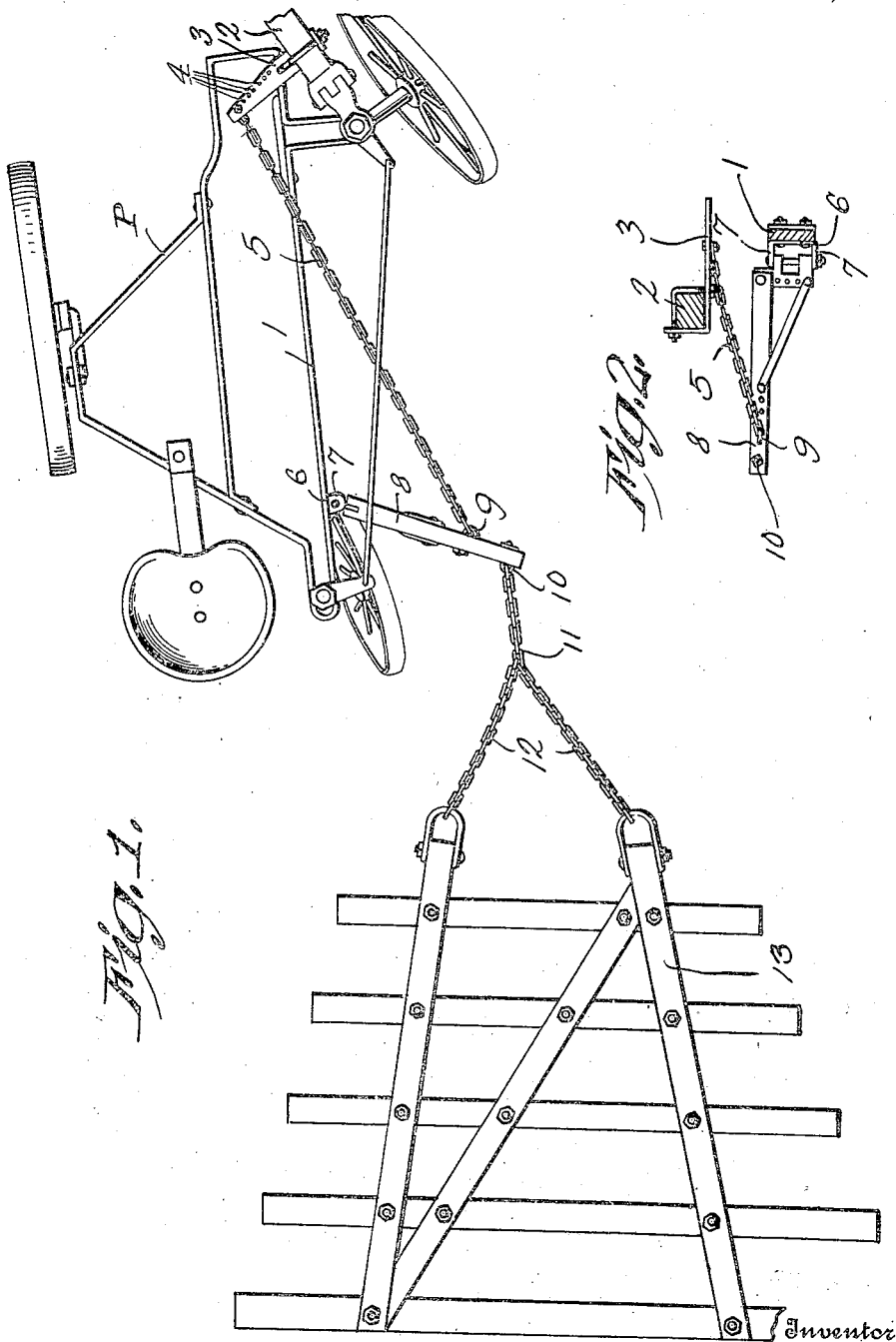

ORVILLE V. BREESE, OF SCOTTSBLUFF, NEBRASKA.

DRAG ATTACHMENT FOR PLOWS.

1,251,632.  Specification of Letters Patent.  Patented Jan. 1, 1918.

Application filed April 12, 1917. Serial No. 161,568.

*To all whom it may concern:*

Be it known that I, ORVILLE V. BREESE, a citizen of the United States, residing at Scottsbluff, in the county of Scotts Bluff and State of Nebraska, have invented a new and useful Drag Attachment for Plows, of which the following is a specification.

The subject of this invention is a drag attachment for plows intended, primarily, for use on wheel mounted or riding plows.

The main object of the invention is to provide a drag which may be readily attached to and drawn behind a plow.

Another object is to provide novel means for attaching the drag to a plow.

Another object is to provide means for attaching a drag to a plow which will yield when the plow is being turned and allow the drag to remain behind and away from the wheels of the plow.

Still another object is to provide a simple and efficient attaching means.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

One practical embodiment of the invention is shown in the accompanying drawings, wherein:—

Figure 1 is a plan view showing the position of the parts as the plow turns.

Fig. 2 is a detail, showing the attaching arms in front elevation.

Referring to the drawings by characters of reference:—

P indicates, generally, a plow mounted on wheels in the usual and well known manner, and having a frame 1, and a tongue 2, which is pivoted to swing in a horizontal plane when the plow is to be turned.

A bracket 3 is secured to the left hand side of the tongue 2, and its extending arm is provided with a series of spaced openings 4 to permit one end of a chain 5 to be adjustably secured to the bracket 3. A clamp 6, is secured to a suitable point of the frame 1, and this clamp is formed with ears 7, to which the inner end of an arm 8 is pivoted. The arm 8 extends to the right of the frame 1, and swings horizontally about its pivot.

An eye bolt 9 is secured to a median point of the arm 8, and to this eye bolt is attached the rear end of the chain 5. Another eye bolt 10 is secured to the arm 8, adjacent its outer end. A rearwardly extending chain 11 has its forward end secured to the eye bolt 10 and its rear end secured to the forward ends of chains 12, the rearward ends of which are secured to a drag 13, of any usual and well known form.

The device is attached to a plow, as hereinbefore set forth, the parts being adjusted so that, when the plow is drawn straight forward, the arm 8 will extend outwardly at right angles to the direction of travel of the plow and draw the drag along the plowed ground to the rear of and slightly to one side of the plow. When the end of a furrow is reached, and the plow is swung to the left, as seen in Fig. 2, the extending arm of bracket 3 swings toward the arm 8, thus slackening the chain 5 and allowing the outer end of arm 8 to swing to the rear. This movement of arm 8 will relieve the drag of any pull and allow it to remain stationary until the plow has again started forward. By this means all danger of the drag on its chain coming in contact with the plow wheels is avoided.

Having described my invention, what I claim as new and desire to secure by Letters Patent, is:—

1. A plow attachment, comprising a drag, an arm secured to the drag and pivotally connected to the plow frame, a tongue secured to the plow, and means connecting the tongue and arm for holding the arm in its extended position during forward travel of the plow and releasing the arm to swing rearwardly when the plow is turning.

2. A drag attachment for plows, comprising a bracket attachable to the tongue of a plow and to extend laterally therefrom, an arm adapted to be pivoted to the plow frame and to extend laterally therefrom in a direction opposite to the bracket, means for connecting the arm and bracket, a drag, and means for connecting the drag to the arm.

In testimony that I claim the foregoing as my own, I have hereto affixed my signature in the presence of two witnesses.

ORVILLE V. BREESE.

Witnesses:
JAMES A. CLINE, Jr.,
H. S. STARK.